United States Patent
Kim

(10) Patent No.: US 10,205,183 B2
(45) Date of Patent: Feb. 12, 2019

(54) DEVICE FOR CHANGING ANODE INLET AND ANODE OUTLET OF FUEL CELL STACK

(71) Applicant: HYUNDAI MOTOR COMPANY, Seoul (KR)

(72) Inventor: Jong Sung Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 466 days.

(21) Appl. No.: 14/954,745

(22) Filed: Nov. 30, 2015

(65) Prior Publication Data

US 2016/0322656 A1    Nov. 3, 2016

(30) Foreign Application Priority Data

Apr. 30, 2015 (KR) .................. 10-2015-0061046

(51) Int. Cl.
| | |
|---|---|
| *H01M 8/2484* | (2016.01) |
| *H01M 8/04225* | (2016.01) |
| *H01M 8/04082* | (2016.01) |
| *H01M 8/04223* | (2016.01) |

(52) U.S. Cl.
CPC ... *H01M 8/04231* (2013.01); *H01M 8/04201* (2013.01); *H01M 8/04225* (2016.02); *H01M 8/2484* (2016.02); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 6,821,668 B1 * | 11/2004 | Perry | ............... | H01M 8/04231 |
| | | | | 429/443 |
| 2009/0029201 A1 * | 1/2009 | Morita | ............. | H01M 8/04201 |
| | | | | 429/412 |

FOREIGN PATENT DOCUMENTS

| | | |
|---|---|---|
| JP | 2004-241273 A | 8/2004 |
| JP | 2006-172935 A | 6/2006 |
| JP | 2007-517372 A | 6/2007 |
| JP | 2008-300061 A | 12/2008 |
| JP | 2013-140731 A | 7/2013 |
| KR | 10-2013-0008322 A | 1/2013 |
| KR | 10-2013-0020500 A | 2/2013 |
| WO | 2014-045018 A1 | 3/2014 |

* cited by examiner

*Primary Examiner* — Jonathan Crepeau
(74) *Attorney, Agent, or Firm* — McDermott Will & Emery LLP

(57) ABSTRACT

A device for changing an anode inlet and an anode outlet of a fuel cell stack includes an inlet manifold connected the anode inlet of the fuel cell stack and an outlet manifold connected to the anode outlet. An inlet and outlet changing means is disposed inside one of the inlet manifold and the outlet manifold and controls flow directions of the anode inlet and the anode outlet to be the same or opposite to each other.

6 Claims, 7 Drawing Sheets

[ INITIAL START-UP PREPERATION ]

-- Related Art --

[ INITIAL START-UP PREPERATION ]

[ NORMAL OPERATION ]

[ INITIAL START-UP PREPERATION ]

[ NORMAL OPERATION ]

[ INITIAL START-UP PREPERATION ]

[ NORMAL OPERATION ]

DEVICE FOR CHANGING ANODE INLET AND ANODE OUTLET OF FUEL CELL STACK

CROSS-REFERENCE TO RELATED APPLICATION

This application claims under 35 U.S.C. § 119(a) the benefit of priority to Korean Patent Application No. 10-2015-0061046 filed on Apr. 30, 2015 the disclosure of which is incorporated herein by reference in its entirety.

TECHNICAL FIELD

The present disclosure relates to a device for changing an anode inlet and an anode outlet of a fuel cell stack, and more particularly, to a device for changing an anode inlet and an anode outlet of a fuel cell stack, which changes the anode inlet and the anode outlet when a fuel cell vehicle starts, thus securing driving stability of the fuel cell vehicle and improving fuel efficiency as the amount of hydrogen exhaust is reduced.

BACKGROUND

A fuel cell system includes a fuel supply system for supplying hydrogen as a fuel to a fuel cell stack and an air supply system for supplying oxygen in the air as an oxidizing agent necessary for an electro-chemical reaction to the fuel cell stack. A heat and water management system of the fuel cell system controls an operating temperature of the fuel cell stack which generates electrical energy by using the hydrogen and air.

The hydrogen is supplied from the fuel supply system to a fuel anode of the fuel cell stack while the oxygen is supplied from the air supply system to an air cathode of the fuel cell stack, so that the hydrogen is oxidized at the fuel anode to generate protons and electrons, in which the hydrogen ions and electrons move to the air cathode through an electrolyte membrane and a separator, respectively. At the air cathode, water is generated through the electro-chemical reaction of the hydrogen ions, the electrons, and the oxygen. The electrical energy is generated through the movement of the electrons.

When a fuel cell vehicle having the fuel cell stack stops, a gas composition at the fuel anode is maintained in the nitrogen atmosphere in which there is almost no oxygen. Then, once the fuel cell vehicle starts again, a constant concentration of hydrogen is required in the fuel cell stack.

When the fuel cell vehicle is prepared to start, a hydrogen purge process for increasing the hydrogen concentration in the fuel stack is performed while exhausting nitrogen from the fuel anode.

The hydrogen purge process reduces a pressure at the fuel anode in the nitrogen atmosphere to smoothly supply new hydrogen to the fuel anode, and simultaneously, supplies the new hydrogen from the fuel supply system to the fuel anode. During the hydrogen purge process, a purge valve connected to an outlet manifold of the fuel anode is opened so that the nitrogen in the fuel anode and a part of the new hydrogen are exhausted to outside through the purge valve.

During hydrogen purge process, it is important to set a suitable purge time. If the purge time is shorter than a reference time, the fuel cell may be shut down due to lack of initial hydrogen concentration. If the purge time is longer than the reference time, although it is possible to secure a sufficient hydrogen concentration in the fuel cell stack, a leakage amount of hydrogen discharged to the outside through the purge valve increases. Thus, the fuel efficiency deteriorates and an additional system is necessary to satisfy the environmental regulations.

Hereinafter, a hydrogen purge process for initial start-up of a fuel cell stack according to the related art will be described in more detail.

FIG. 1 is a schematic view illustrating a hydrogen purge process for a fuel cell stack according to the related art. In FIG. 1, a fuel cell stack 20 includes a plurality of fuel cells stacked therein.

An anode inlet and an anode outlet of the fuel cell stack 20, through which hydrogen is supplied or discharged, are connected to an inlet manifold 10 and an outlet manifold 30.

For reference, manifolds are additionally provided to a cathode inlet and a cathode outlet of the fuel cell stack.

The inlet 12 of the inlet manifold 10 and the outlet 32 of the outlet manifold 30 are opened in the same direction.

An ejector 14 of a fuel supply system is connected to the inlet 12 of the inlet manifold 10, and a purge valve 34 is connected to the outlet 32 of the outlet manifold 30.

The inlet 12 of the inlet manifold 10 and the outlet 32 of the outlet manifold 30 are opened in the same direction. The fuel cell stack 20 includes a first cell 22 which is located proximate to the inlet 12 and the outlet 32 and an n-th cell 24 which is located farthest away from the inlet 12 and the outlet 32.

In the related art, the hydrogen purge process for initiating the fuel cell stack includes supplying hydrogen from the fuel supply system into the inlet manifold 10 through the ejector 14. The fuel anode in the fuel cell stack 20 is filled with the hydrogen from the inlet manifold 10. Residual nitrogen and impurities in the fuel anode are discharged through the purge valve, which is controlled to be opened during the hydrogen purge process, 34.

If the period of the hydrogen purge process, that is, a purge time, is longer than a reference time, although it is possible to secure a sufficient hydrogen concentration in the stack, a leakage amount of hydrogen discharged to outside through the purge valve increases. Thus, the fuel efficiency deteriorates and an additional system is required to satisfy the environmental regulations.

In addition, since a flow rate of hydrogen passing through the first cell 22, which is proximate to the inlet 12 and the outlet 32, in the fuel cell stack 20, is larger than that of the n-th cell 24, a large amount of hydrogen is discharged to outside through the inlet manifold 10, the first cell 22, the outlet manifold 30, and the purge valve 32 in sequence during the hydrogen purge process. Thus, the fuel efficiency deteriorates and an additional system is required to satisfy the environmental regulations.

When the period of a hydrogen purge process is reduced in order to minimize hydrogen discharged to outside due to the above problem, the hydrogen concentration in the stack is reduced, thus causing instability in a fuel cell initial start.

The description provided above as a related art of the present disclosure is just for helping in understanding the background of the present disclosure and should not be construed as being included in the related art known by those skilled in the art.

SUMMARY OF THE DISCLOSURE

The present disclosure has been made in an effort to solve these problems and to provide a device for changing an anode inlet and an anode outlet of a fuel cell stack, capable of changing flow directions of hydrogen at the anode inlet and the anode outlet to have opposite flow directions to each other when the fuel cell stack starts. Thus, hydrogen flow paths for each cell passing through an inlet manifold, a fuel anode of each cell, and an outlet manifold sequentially have the same length. Accordingly, the hydrogen concentration for the fuel anodes of the stack may increase, and the quantity of hydrogen discharged to outside may be minimized, thus improving stability of the initial fuel cell start-up and fuel efficiency.

According to an embodiment of the present inventive concept, a device for changing an anode inlet and an anode outlet of a fuel cell stack includes an inlet manifold connected to the anode inlet of the fuel cell stack. An outlet manifold is connected to the anode outlet. An inlet and outlet changing means is disposed inside one of the inlet manifold and the outlet manifold and controls flow directions of the anode inlet and the anode outlet to be the same or opposite to each other.

The inlet and outlet changing means may include a hydrogen guide plate installed in the inlet manifold in a longitudinal direction and spatially separating a first hydrogen guide path from a second hydrogen guide path. The first hydrogen guide path guides hydrogen to a rear end of the fuel cell stack, and the second hydrogen guide path guides the hydrogen to a front end of the fuel cell stack. A variable gate is rotatably attached to a front end of the hydrogen guide plate and selectively blocks one of the first and second hydrogen guide paths A guide hole may be formed between a rear end of the hydrogen guide plate and a rear end wall surface of the inlet manifold in order to guide the hydrogen flowing therein through the first hydrogen guide path to the fuel cell stack.

The inlet and outlet changing means may further include an actuator connected to a rotational shaft of the variable gate.

The variable gate rotates in one direction to block the inlet of the second hydrogen guide path at an initial fuel cell start-up, and rotates in the opposite direction to block the inlet of the first hydrogen guide path during a normal operation after the initial fuel cell start-up.

The inlet and outlet changing means may include a three way valve installed on a hydrogen supply line connected to the inlet of the inlet manifold. A branch line may be branched from the three way valve and connected to a rear end of the inlet manifold to communicate with the inlet manifold. A main hydrogen supply line is connected between the three way valve and the anode inlet.

The three way valve may be opened in one direction at the initial fuel cell start-up such that hydrogen is supplied to the branch line and the rear end of the inlet manifold, and is opened in another direction during the normal operation after the initial fuel cell start-up such that hydrogen is supplied to a main hydrogen supply line and the anode inlet of the inlet manifold.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example, both gasoline-powered and electric-powered vehicles.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus, are not limitative of the present disclosure.

Figure 1:
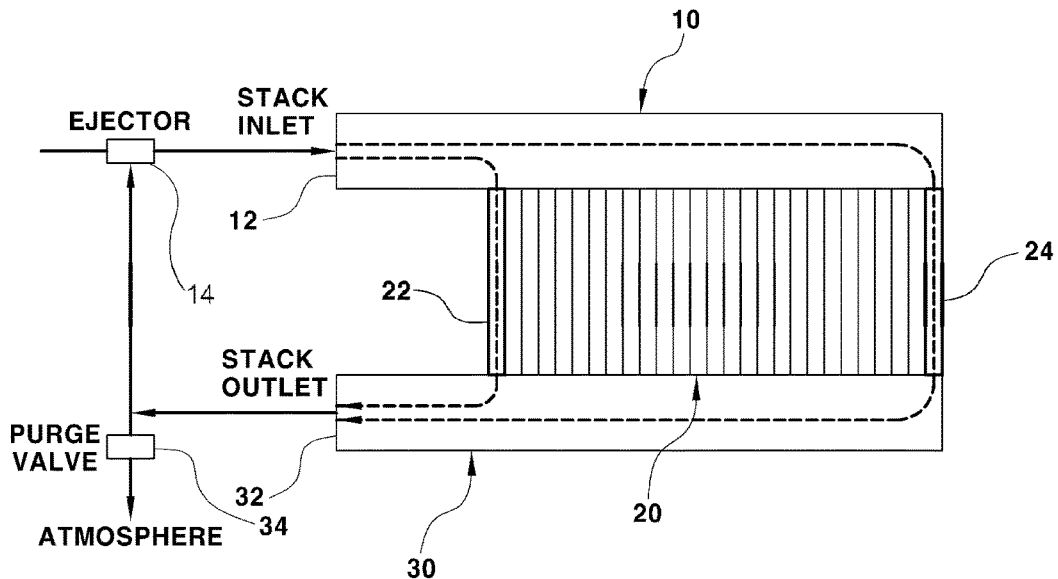
FIG. 1 is a schematic view illustrating a hydrogen purge process performed in a fuel cell stack according to the related art.

It should be understood that the appended drawings are not necessarily to scale, presenting a somewhat simplified representation of various features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of an electro-hydraulic brake system and a method for controlling the same of the present disclosure, examples of which are illustrated in the accompanying drawings and described below.

Hereinafter, exemplary embodiments of the present inventive concept will be described with reference to the accompanying drawings.

For the purpose of helping the present disclosure to be understood, the operation concept of a hydrogen purge process during an initial start-up and a normal operation when a device for changing an anode inlet and an anode outlet of the present disclosure is used will be described with reference to FIGS. 2A-2D as follows.

FIGS. 2A-2D are conceptual diagrams illustrating a hydrogen purge process during a start-up of a fuel cell vehicle and a normal operation when a device for changing an anode inlet and an anode outlet of a fuel cell stack is used according to an embodiment of the present inventive concept.

Figure 2A:
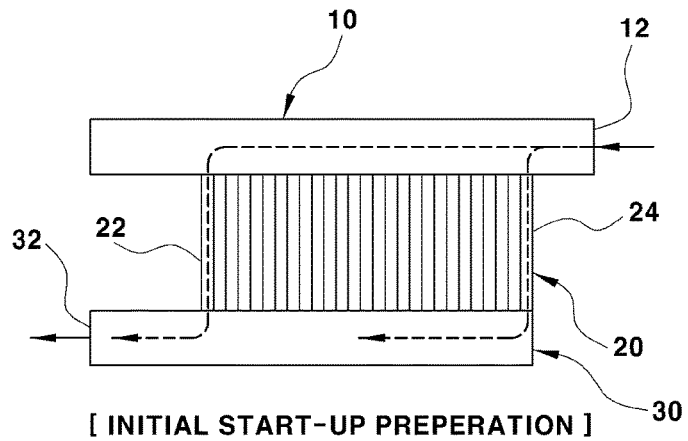
FIGS. 2A-2D are conceptual diagrams illustrating a hydrogen purge process performed in a fuel cell stack according to the present inventive concept.
Figure 2B:
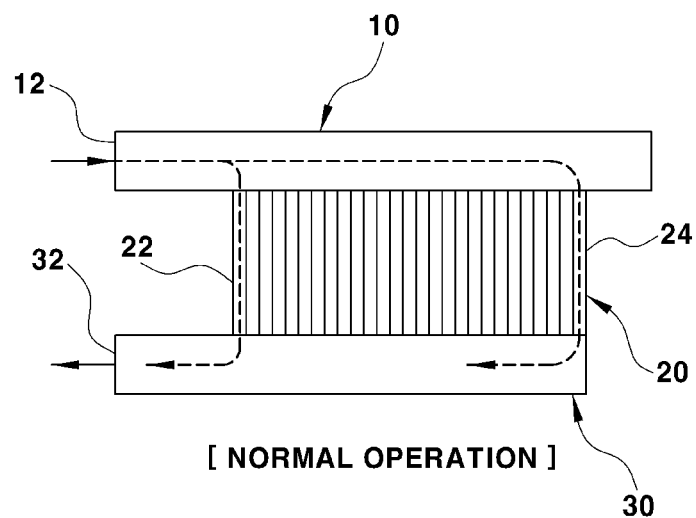

Referring to FIGS. 2A and 2B, an anode inlet 12 and an anode outlet 32 of a fuel cell stack 20 are connected to an inlet manifold 10 and an outlet manifold 30, respectively, through which hydrogen is supplied or discharged.

When a fuel cell vehicle starts as shown in FIG. 2A, the anode inlet 12 of the inlet manifold 10 and the anode outlet 32 of the outlet manifold 30 have the same flow direction to each other for a hydrogen purge process. During a normal operation after the vehicle starts as shown in FIG. 2B, the inlet 12 is changed to have the opposite flow direction as the outlet 32.

Thus, during preparation of the vehicle start-up, hydrogen flow paths for each cell passing through the inlet manifold 10, each cell in the stack 20, and the outlet manifold 30 sequentially have the same length.

For example, referring to a dotted line with an arrow in FIG. 2A, the flow paths of hydrogen for each cell in the fuel cell stack 20 have the same length at the initial start-up.

Figure 2C:
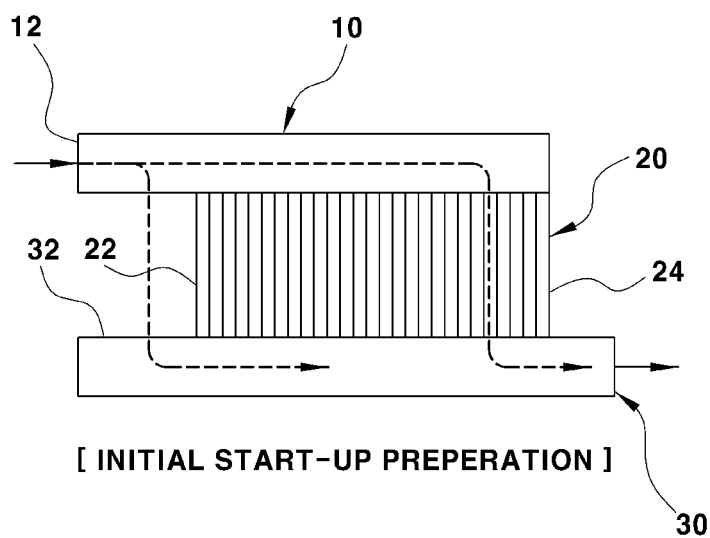
Figure 2D:
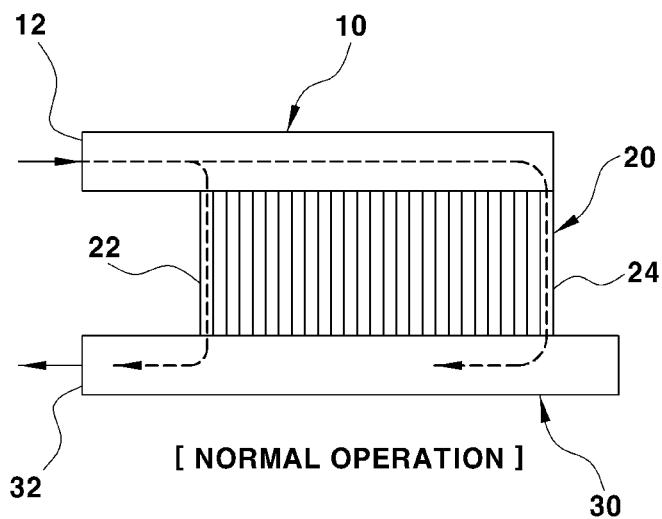

Referring to FIGS. 2C and 2D, at the initial start-up for driving a fuel cell vehicle, hydrogen is discharged from the outlet 32 in the same flow direction as a direction in which the hydrogen flows into the inlet 12 for the hydrogen purge process. During a normal operation after the initial start of the vehicle, the outlet 32 is changed to have the opposite flow direction as the inlet 12.

When the outlet 32 is changed, referring to a dotted line with an arrow in FIG. 2C, hydrogen flow paths for each cell sequentially passing through the inlet manifold 10, each cell in the stack 20, and the outlet manifold 30, have the same length during preparation of the start-up.

During the hydrogen purge process, when the flow paths of hydrogen have the same length for each cell, flow rates of hydrogen at each flow path may be adjusted to the same level.

As described above, when the fuel cell stack 20 is initiated, the inlet of the inlet manifold 10 and the outlet of the outlet manifold 30, which are an inlet and an outlet of the fuel anode, are variably controlled for the inlet of the inlet manifold 10 and the outlet of the outlet manifold 30 to have opposite flow directions to each other for the hydrogen purge process. Thus, the flow paths of hydrogen, which sequentially passes through the inlet manifold 10, the fuel anodes of each cell constituting the stack 20, and the outlet manifold 30 may have the same length. Therefore, the hydrogen concentration may uniformly increase with respect to the fuel anodes of each cell constituting the stack and the stability of the initial start-up may be improved.

Since the flow rates of hydrogen passing through the inlet manifold 10, each cell, and the outlet manifold 30 may be adjusted to the same level, as described above, the hydrogen passing through the first cell proximate to the inlet of the inlet manifold 10 may be prevented from being rapidly discharged to an outside through the outlet manifold 30 during the hydrogen purge process. Thus, during the hydrogen purge process, the quantity of hydrogen discharged to an outside may decrease so that the fuel efficiency may be improved.

Hereinafter, a configuration and an operation of a device for changing an anode inlet and an anode outlet of a fuel cell stack according to one embodiment of the present inventive concept will be described as follows.

Figure 3A:
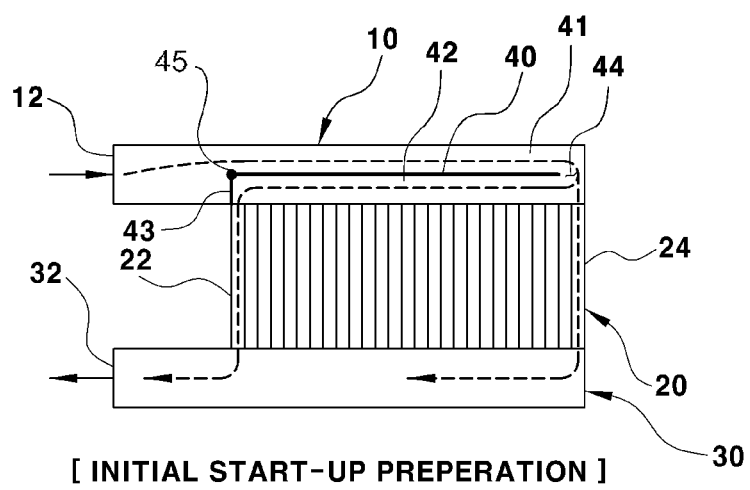
FIGS. 3A and 3B are schematic views illustrating a device for changing an anode inlet and an anode outlet of a fuel cell stack according to an embodiment of the present inventive concept.
Figure 3B:
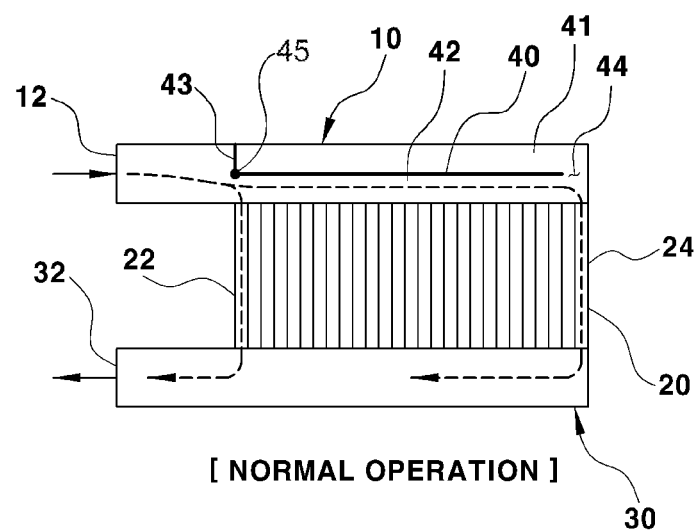

FIGS. 3A and 3B are schematic views illustrating a device for changing an anode inlet and an anode outlet of a fuel cell stack according to an embodiment of the present inventive concept.

A device for changing an anode inlet and an anode outlet of a fuel cell stack according to an embodiment of the present inventive concept includes an anode inlet and outlet changing means according to the present disclosure is installed to an inside of one of the inlet manifold 10 and the outlet manifold 30 to control such that the anode inlet of the inlet manifold 10 and the anode outlet of the outlet manifold 30 have the same or opposite flow directions to each other. In the present disclosure, the anode inlet and outlet changing means is installed to the inlet manifold 10 as an embodiment.

According to an embodiment of the present inventive concept, a hydrogen guide plate 40 is installed to an inside of the inlet manifold 10 in a longitudinal direction thereof. In other words, the hydrogen guide plate 40 is fixed to the inside of the inlet manifold 10 in the longitudinal direction thereof while dividing the inner space vertically and equally into upper and lower spaces.

The upper space of the inlet manifold 10 partitioned by the hydrogen guide plate 40 serves as a first hydrogen guide path 41 which guides the hydrogen to a rear end (the n-th cell) of the stack 20, and the lower space serves as a second hydrogen guide path 42 which guides the hydrogen to a front end (the first cell) of the stack 20.

A guide hole 44 is formed between a rear end of the hydrogen guide plate 40 and a rear end wall surface of the inlet manifold 10 in order to guide the hydrogen flowing therein through the first hydrogen guide path 41 to the n-th cell of the stack 20.

A variable gate 43 is rotatably installed to a front end of the hydrogen guide plate 40 to selectively block one of the first and second hydrogen guide paths 41 and 42.

An actuator 45 such as a motor may be connected to a rotational shaft of the variable gate 43 to rotate the variable gate 43 at a predetermined angle.

Therefore, for the hydrogen purge process for the initial start-up for driving a fuel cell vehicle, the variable gate 43 is changed to be located at a position at which the inlet of the second hydrogen guide path 42 is blocked, so that the first hydrogen guide path 41 is opened.

As the variable gate 43 blocks the second hydrogen guide path 42, the inlet of the inlet manifold 10 is substantially changed to the guide hole 44 between a rear end of the inlet manifold 10, that is, the rear end of the hydrogen guide plate 40 and the rear end wall surface of the inlet manifold 10, so that the inlet of the inlet manifold 10 is located in the opposite direction to the outlet of the outlet manifold 30.

In order to initiate the fuel cell stack, the hydrogen purge process performs the following steps: supplying new hydrogen from the fuel supply system to the first hydrogen guide path 41 in the inlet manifold 10; filling fuel anodes of each cell constituting the stack 20 with the new hydrogen through the guide hole 44 located at the rear end of the first hydrogen guide path 41; and discharging a part of the new hydrogen exhausted from the fuel anodes of each cell along with residual nitrogen impurities in the fuel anodes and to the outside through the outlet 32 of the outlet manifold 30.

Referring to FIG. 3A, when the initial start-up is prepared, the hydrogen is supplied through the first hydrogen guide path 41, so that the flow paths of hydrogen, which sequentially passes through the inlet manifold 10, each cell constituting the stack 20, and the outlet manifold 30, have the same length.

For example, as denoted as a dot-line arrow in FIG. 3A, the flow paths of hydrogen, which passes through the first cell 22 and the n-th cell 24 of the cells arranged at both ends of the stack, have the same length at the initial start-up.

Thus, during the hydrogen purge process, in a state in which the flow paths of hydrogen, which sequentially passes through the inlet manifold 10, the fuel anodes of each cell, and the outlet manifold 30, are adjusted to have the same length, the hydrogen supplied to each cell via the inlet manifold 10 is maintained at a constant concentration for the initial start-up while being uniformly distributed in the fuel anodes of each cell, so that the stability at the initial start-up may be improved.

Since the flow rates of hydrogen sequentially passing through the inlet manifold 10, each cell, and the outlet manifold 30 may be adjusted to the same level, as described above, the hydrogen passing through the first cell proximate to the inlet of the inlet manifold 10 may be prevented from being rapidly discharged to the outside through the outlet manifold 30 during the hydrogen purge process. Thus, during the hydrogen purge process, the quantity of hydrogen discharged to the outside may be minimized so that the hydrogen consumption is reduced, thereby improving the fuel efficiency.

Figure 5:
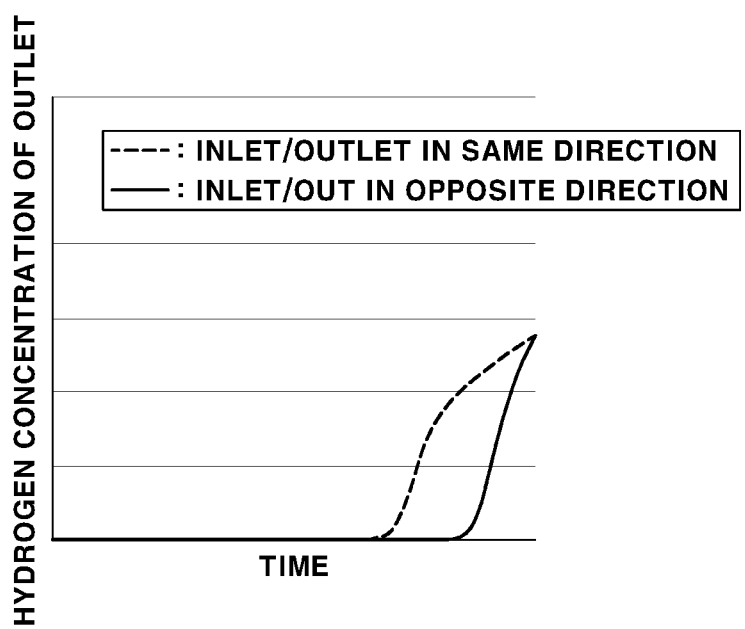
FIG. 5 is a graph of comparing a variation of a hydrogen concentration measured during a hydrogen purge process when a device for changing an anode inlet and an anode outlet of a fuel cell stack is used according to the present disclosure with a variation during a hydrogen purge process according to the related art.

FIG. 5 is a graph of comparing a variation of a hydrogen concentration, which is measured during a hydrogen purge process when a device for changing an anode inlet and an anode outlet of a fuel cell stack according to the present disclosure is used, with a hydrogen purge process according to the related art in which an inlet and an outlet of the fuel anode have the same direction. When the inlet and the outlet of the fuel anode have opposite flow directions to each other according to the present disclosure, the hydrogen concentration in the outlet of the fuel anode gradually increases over time. During the hydrogen purge process, the quantity of hydrogen discharged to the outside is minimized, so that the hydrogen consumption is reduced, thereby improving the fuel efficiency.

When the fuel cell is normally operated after the initial start-up thereof, the variable gate 43 is located at a position to block the inlet of the first hydrogen guide path 41 while only the second hydrogen guide path 42 is opened. Thus, the inlet 12 of the inlet manifold 10 and the outlet 32 of the outlet manifold 30 have the same flow direction again, so that the flow rate deviation between the cells may be minimized and the driving stability of the stack may be achieved.

Figure 6:
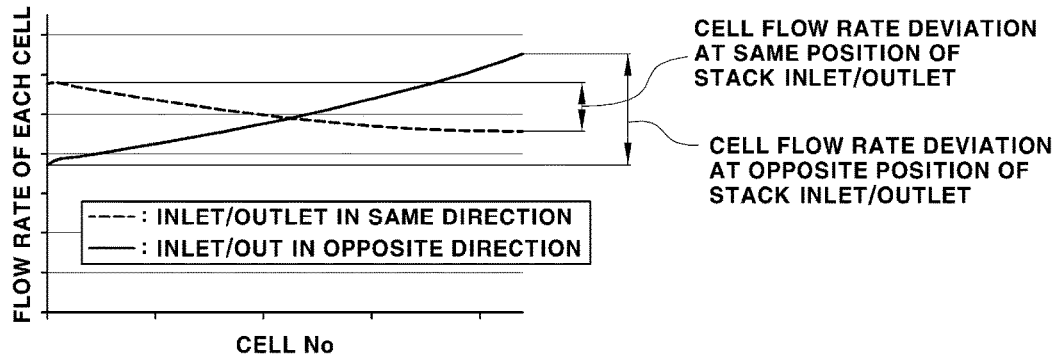
FIGS. 6-7B are graphs of comparing a cell flow rate deviation measured during a hydrogen purge process when a device for changing an anode inlet and an anode outlet of a fuel cell stack is used according to the present disclosure with a cell flow rate deviation during a hydrogen purge process according to the related art.
Figure 7A:
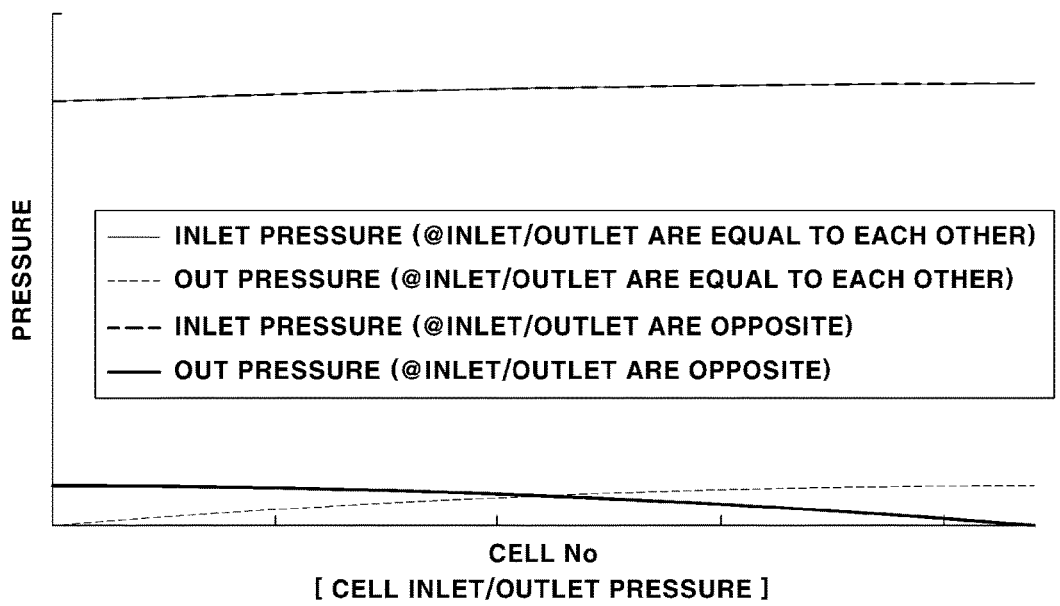
Figure 7B:
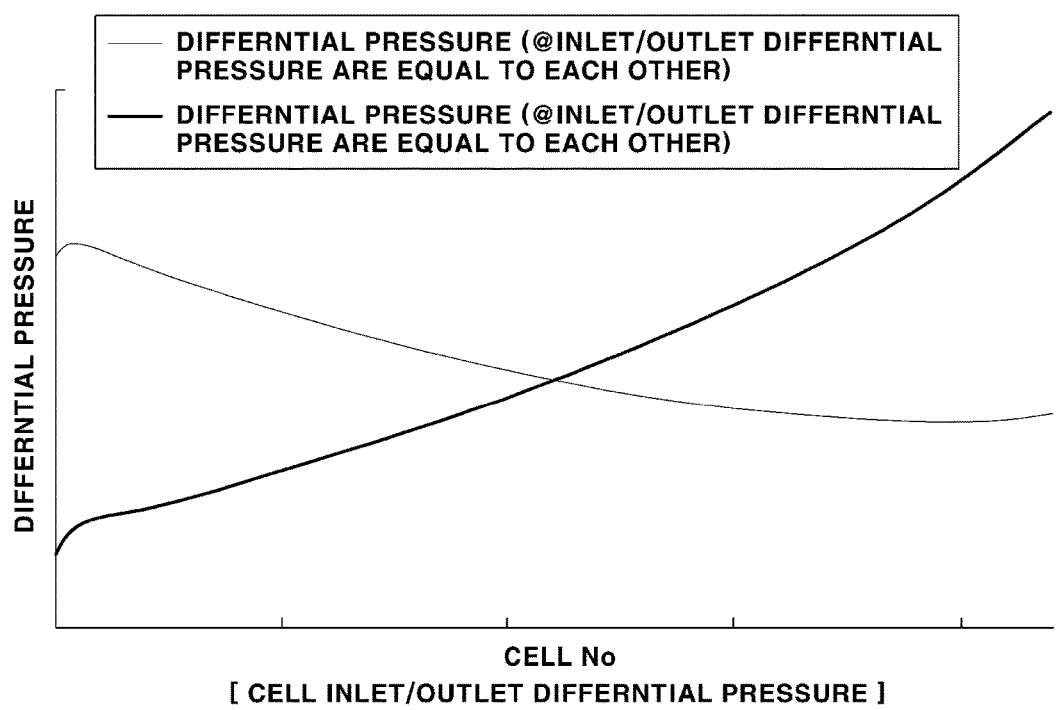

Referring to FIGS. 6-7B, as compared with a case in which the inlet 12 of the inlet manifold 10 and the outlet 32 of the outlet manifold 30 are changed to have opposite flow directions to each other, the flow rate deviation between the cells is reduced. Therefore, when the fuel cell is normally operated after the initial start-up, the inlet 12 of the inlet manifold 10 and the outlet 32 of the outlet manifold 30 are allowed to be again oriented in the same direction.

FIGS. 7A and 7B show a result of analyzing pressures of the cell inlet and outlet depending on the stack inlet and outlet directions, pressures of each cell of the stack gradually increase toward blocked sides of the inlet and outlet manifolds. When the inlet and the outlet of the manifold have the same flow direction, a differential pressure deviation between the cells is further reduced compared with having opposite flow directions to each other. In addition, since the flow rates of each cell is proportional to the differential pressures, when the inlet and the outlet of the manifold are identical to each other, the flow rate deviation further decreases.

Hereinafter, a configuration and an operation of a device for changing an anode inlet and an anode outlet of a fuel cell stack according to another embodiment of the present inventive concept will be described as follows.

Figure 4A:
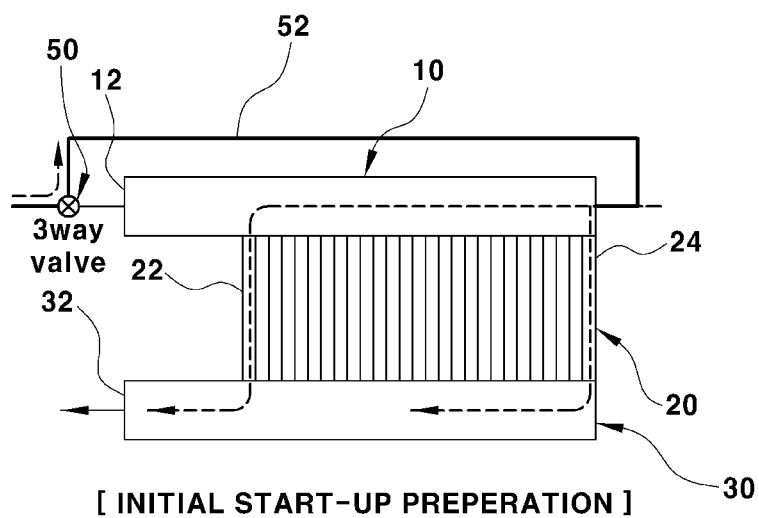
FIGS. 4A and 4B are schematic views illustrating a device for changing an anode inlet and an anode outlet of a fuel cell stack according to another embodiment of the present inventive concept.
Figure 4B:
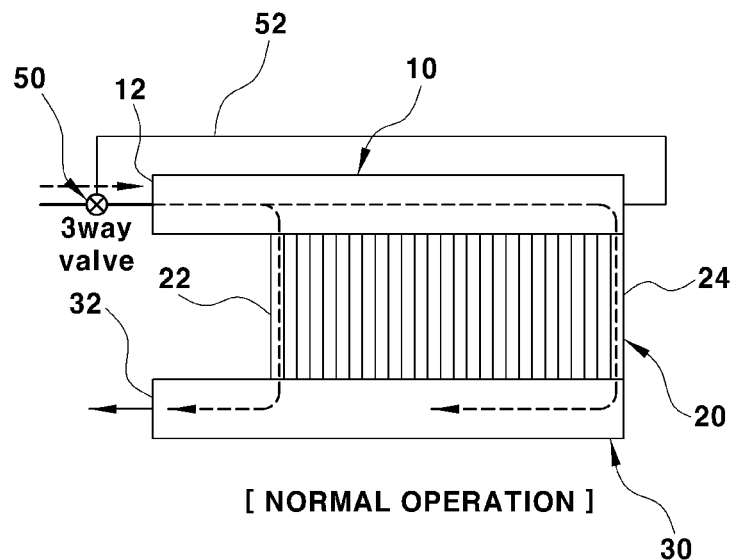

FIGS. 4A and 4B are schematic views illustrating a device for changing an anode inlet and an anode outlet of a fuel cell stack according to another embodiment of the present inventive concept.

A device for an anode inlet and an anode outlet according to another embodiment of the present inventive concept includes a three way valve 50 installed on a hydrogen supply line connected to the inlet 12 of the inlet manifold 10. A branch line 52 is branched from the three way valve 50 and connected to a rear end of the inlet manifold 10 to communicate with the rear end of the inlet manifold 10.

For the hydrogen purge process for the initial start-up for driving the fuel cell vehicle, the three way valve 50 is opened to allow the hydrogen to be supplied to the branch line 52 and the rear end of the inlet manifold 10, so that the inlet 12 of the inlet manifold 10 is substantially blocked.

Thus, the rear end of the inlet manifold 10 is changed to an inlet and the changed inlet is placed in the opposite direction to the outlet 32 of the outlet manifold 30.

Referring to FIGS. 4A and 4B, as described above, when the initial start-up is prepared, the rear end of the inlet manifold 10 becomes an inlet by using the three way valve 50, so that the flow paths of hydrogen, which sequentially passes through the inlet manifold 10, each cell constituting the stack 20, and the outlet manifold 30, have the same length.

For example, as denoted as a dot-line arrow in FIG. 4A, the flow paths of hydrogen, which passes through the first cell 22 and the n-th cell 24 of each cell arranged at both ends of the stack, have the same length for the initial start-up.

Thus, during the hydrogen purge process, in a state in which the flow paths of hydrogen, which sequentially passes through the rear end of the inlet manifold 10, the fuel anodes of each cell, and the outlet manifold 30, have the same length. The hydrogen supplied to each cell is maintained at a constant concentration while being uniformly distributed into the fuel anodes of each cell, so that the stability at the initial start-up may be improved.

When the fuel cell is normally operated after the initial start-up thereof as shown in FIG. 4B, the three way valve 50 is opened to enable the hydrogen to be supplied to the hydrogen supply line and the inlet 12 of the inlet manifold 10, so that the inlet 12 of the inlet manifold 10 and the outlet 32 of the outlet manifold 30 have the same flow direction, so the flow rate deviation between the cells may be minimized and the driving stability of the stack may be achieved.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

The device for changing an anode inlet and an anode outlet of a fuel cell stack of the present invention has the following effects:

First, when the fuel cell stack is initiated, the inlet of the inlet manifold and the outlet of the outlet manifold, which are an inlet and an outlet of the fuel anode, are variably controlled for the inlet of the inlet manifold and the outlet of the outlet manifold to have opposite flow directions to each other, so that the flow paths of hydrogen, which sequentially passes through the inlet manifold, the fuel anodes of each cell, and the outlet manifold, may have the same length.

Thus, the hydrogen concentration may uniformly increase with respect to the fuel anodes of each cell constituting the stack and the stability of the initial start-up may be improved.

Second, when the flow paths of hydrogen, which sequentially passes through the inlet manifold, the fuel anodes of each cell, and the outlet manifold, are controlled to have the same length, since hydrogen passing through the inlet manifold, the fuel anodes of each cell, and the outlet manifold has the same flow rate, the hydrogen passing through the cell proximate to the inlet of the inlet manifold may be prevented from being rapidly discharged to the outside through the outlet manifold. During the hydrogen purge process, the quantity of hydrogen discharged to an outside may be minimized, so that the fuel efficiency may be improved.

Third, when the fuel cell is normally operated after the initial start-up thereof, the inlet of the inlet manifold and the outlet of the outlet manifold are variably controlled to have the same flow direction, so that the flow rate deviation between the cells may be minimized and the driving stability of the stack may be achieved.

What is claimed is:

1. A device for changing flow directions of a fuel cell stack, the device comprising:
    an inlet manifold connected to the anode inlet of the fuel cell stack;
    an outlet manifold connected to the anode outlet; and
    a changing device disposed inside one of the inlet manifold and the outlet manifold and configured to control flow directions inside the inlet manifold and an the outlet manifold to be the same or opposite to each other,
    wherein the changing device includes a hydrogen guide plate disposed inside the inlet manifold in a longitudinal direction and spatially separating a first hydrogen guide path from a second hydrogen guide path, in which the first hydrogen guide path guides hydrogen to a rear end of the fuel cell stack and the second hydrogen guide path guides the hydrogen to a front end of the fuel cell stack.

2. The device of claim 1, wherein flow directions for a hydrogen purge process are controlled to be the same during an initial fuel cell start-up, and the flow directions are controlled to be opposite during a normal operation after the initial fuel cell start-up.

3. The device of claim 1, wherein the inlet and outlet changing device further includes a variable gate rotatably attached to a front end of the hydrogen guide plate and selectively blocking one of the first and second hydrogen guide paths.

4. The device of claim 3, further comprising a guide hole formed between a rear end of the hydrogen guide plate and a rear end wall surface of the inlet manifold in order to guide the hydrogen flowing therein through the first hydrogen guide path to the fuel cell stack.

5. The device of claim 3, wherein the inlet and outlet changing device includes an actuator connected to a rotational shaft of the variable gate.

6. The device of claim 3, wherein the variable gate rotates in one direction to block the inlet of the second hydrogen guide path at an initial fuel cell start-up, and rotates in another direction to block the inlet of the first hydrogen guide path during a normal operation after the initial fuel cell start-up.

* * * * *